April 27, 1965
B. BERMAN
3,181,050
MOTOR CONTROL SYSTEM
Filed July 8, 1960
4 Sheets-Sheet 2
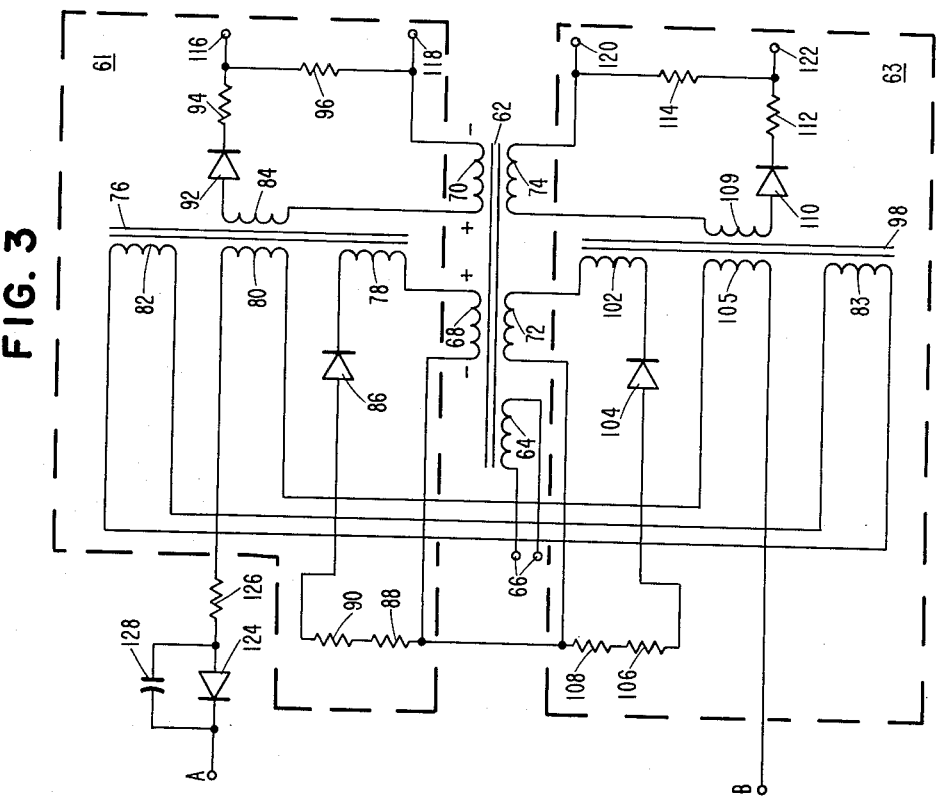
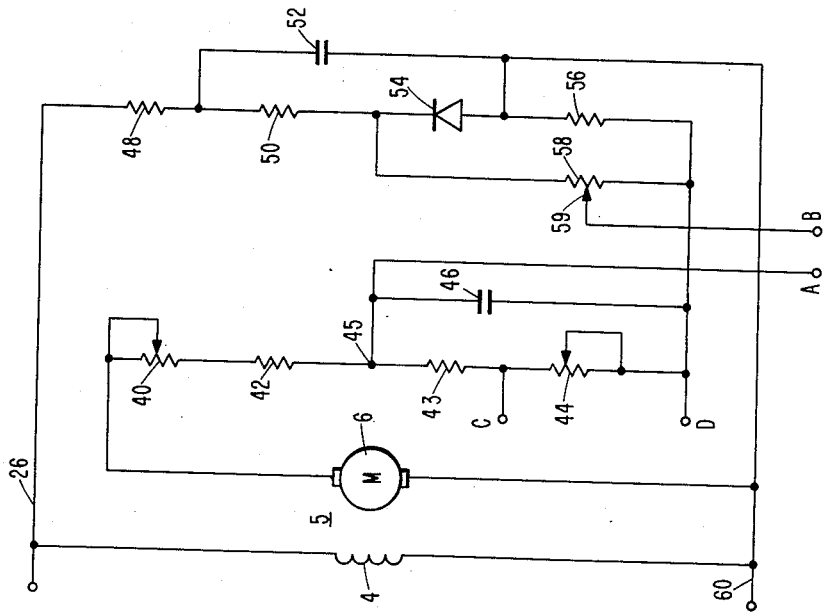
INVENTOR.
BARUCH BERMAN
BY April 27, 1965

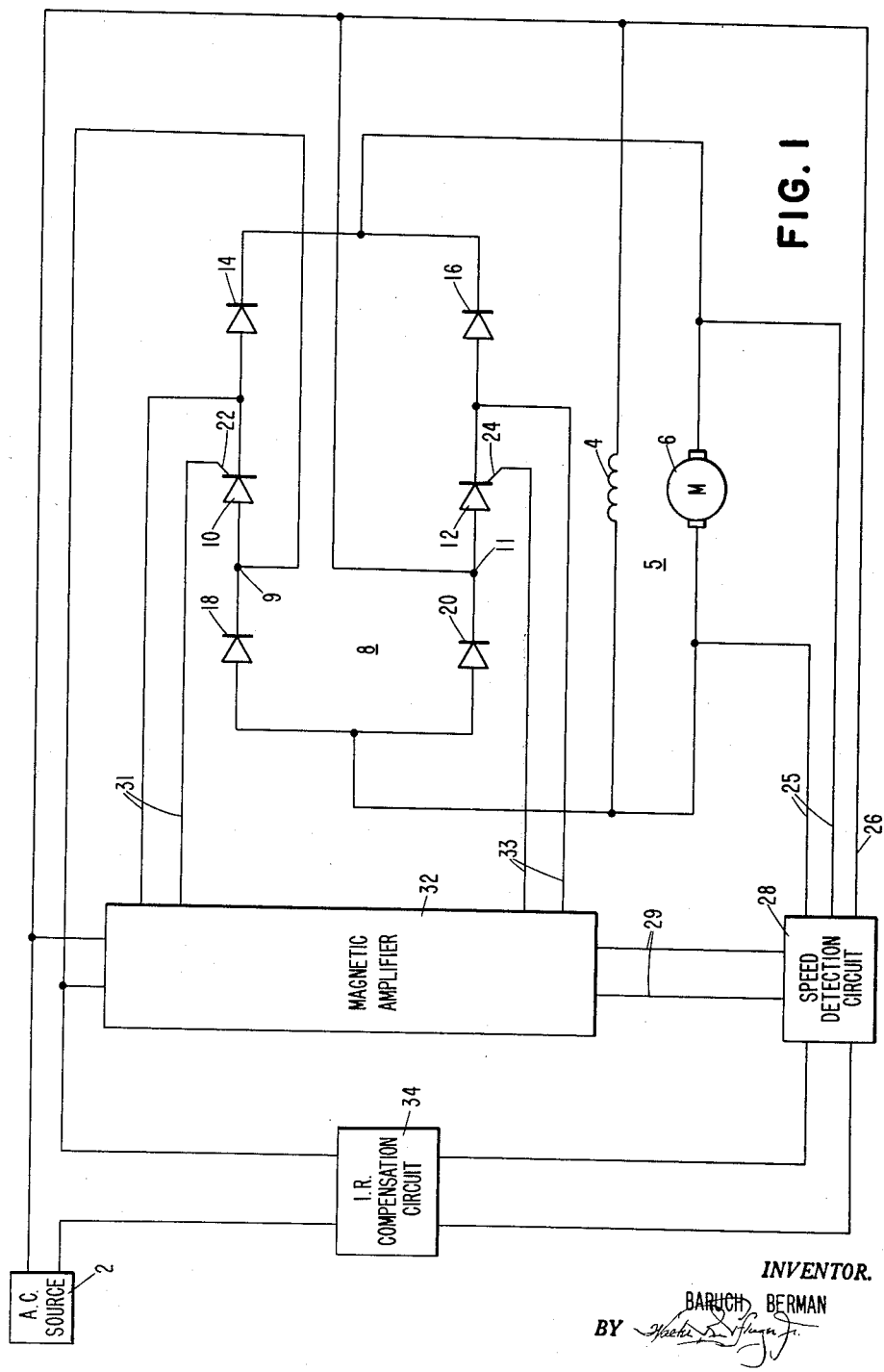

B. BERMAN 3,181,050

MOTOR CONTROL SYSTEM

Filed July 8, 1960

*INVENTOR.*
BARUCH BERMAN
BY

INVENTOR
BARUCH BERMAN
BY

United States Patent Office 3,181,050
Patented Apr. 27, 1965

3,181,050
MOTOR CONTROL SYSTEM
Baruch Berman, Rivervale, N.J., assignor, by mesne assignments, to The New York Air Brake Company, New York, N.Y., a corporation of New Jersey
Filed July 8, 1960, Ser. No. 41,678
4 Claims. (Cl. 318—331)

This invention relates to a motor control system and more particularly to a motor control system employing controlled rectifiers.

Motor control systems are relatively well known in the art, and over the years they have been improved as new and better components have been developed. The magnetic amplifier is a device which has made an important contribution to the field of motor control systems because of its ruggedness, reliability and capacity to handle large amounts of power. The use of magnetic amplifiers alone, however, does not always result in control systems having the operating characteristics required for all applications.

A device of relatively recent development which is capable of handling large amounts of power in relation to its size and weight is the semiconductor diode. Until the present time, the use of diodes has been limited to rectification, but with the development of the controlled diode a new field of possible uses, particularly as a small lightweight rectifier which also acts as a control device, has been opened. A controlled diode differs from the conventional diode by the addition of a control element to the usual anode and cathode elements. In a diode of this type a gating action may be obtained, and, not only must current be in the proper direction, but there also must be a sufficient potential on the control element before the diode begins conducting.

According to one feature of this invention a magnetic amplifier is coupled with a controlled diode to form the basis of a motor control system. The controlled diode is employed to control the passage of current between an electric source and an electric motor. The output of the magnetic amplifier is employed as a control signal for the controlled diode. This combination of elements results in a control system containing basically reliable elements which is relatively small and light compared to its control capacity.

Another feature of this invention is a motor control system having a motor control loop employing a controlled diode and a magnetic amplifier. When the system is used to control the speed of a motor then a device which produces a potential proportional to the speed of the motor is employed. This potential is compared with a reference potential to produce a deviation signal which in turn may be used as an input to the magnetic amplifier. The output of the magnetic amplifier controls the controlled diode, which in turn regulates the passage of current from the source to the motor. If the motor begins to increase in speed, the deviation signal changes causing the firing angle of the magnetic amplifier to increase. The power which passes through the controlled rectifiers then decreases thus decreasing the speed of the motor. Similarly, if the motor speed begins to decrease the deviation signal changes causing the firing angle of the magnetic amplifier to decrease thereby permitting the controlled rectifier to pass more current to the motor thus increasing its speed. Accordingly, a control loop is established employing a magnetic amplifier as a trigger preamplifier and a controlled diode as a power stage.

According to a more specific feature of this invention a motor control system is provided for controlling the speed of a direct current motor operating on alternating current power. In such a situation it is necessary to convert the alternating current into direct current which is normally accomplished by employing diodes specifically for this purpose. By means of this invention the conversion circuit may also control the amount of current passing through in addition to changing its form from A.C. to D.C. The controlled rectifier accomplishes its control function by allowing only a portion of the half cycle wave to pass, this portion corresponding to the portion of the half wave during which the magnetic amplifier produces an output. Since the time duration of the magnetic amplifier output may be made proportional to the deviation from the desired speed, it is readily apparent that effective motor control is accomplished.

According to another specific feature of this invention, the potential appearing across the armature of the motor is used as being approximately proportional to the speed of the motor. This potential is compensated to correct for the discrepancy caused by voltage drop across internal armature resistance and is then compared with a reference voltage to obtain a deviation signal. This deviation signal is used as an input to a magnetic preamplifier which in turn regulates a controlled diode power stage. Such a motor control system has good regulation over a wide range of speeds, has soft, rapid starts and good acceleration control.

These and other features of this invention may be more fully appreciated when considered in light of the following description and drawings in which:

FIG. 1 is a block diagram representation of a preferred embodiment according to this invention;

FIG. 2 is a schematic representation of the speed detection circuit;

FIG. 3 is a schematic representation of the magnetic amplifier circuit;

Figure 4B:
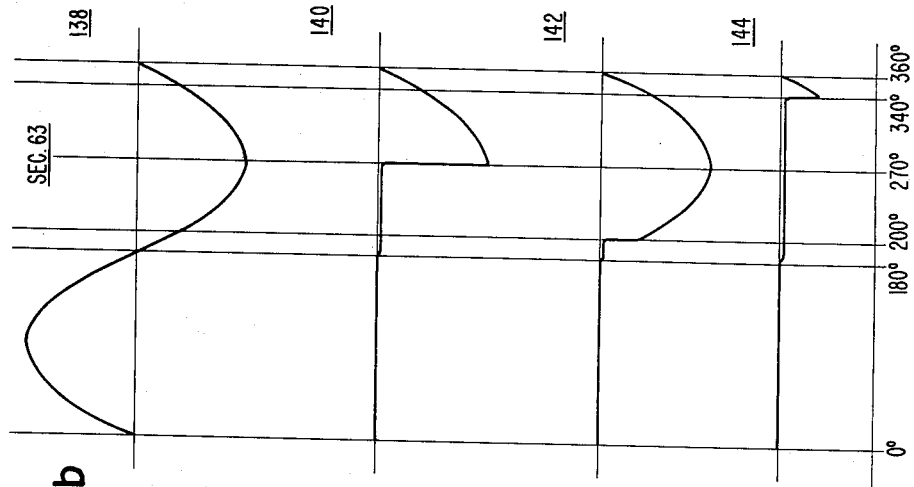
FIGS. 4a and 4b illustrate various wave shapes which may appear on the output of the magnetic amplifier circuit.

A preferred embodiment of this invention is shown in the block diagram of FIG. 1. The circuit involves the controlling of a direct current shunt motor, generally indicated by the numeral 5, with a field winding 4 and an armature 6 which operates from an alternating current source 2. As current flows from the alternating current source 2 to the motor 5, it passes through a full-wave rectifier network 8. This network has a controlled diode 10 and a conventional diode 14 in the first leg, a controlled diode 12 and a conventional diode 16 in a second leg, a conventional diode 18 in a third leg and a conventional diode 20 in a fourth leg. During a first-half cycle of the alternating current source 2 assume that a positive potential appears at point 9 and a negative potential appears at point 11. Under these conditions current flow is from the A.C. source 2, through the IR compensation circuit 34 to the point 9, through the controlled diode 10, the diode 14, the motor armature 6, the diode 20 to point 11, and back to the A.C. source. During the subsequent half-cycle the polarities at points 9 and 11 reverse. During this second half cycle point 11 is positive and accordingly current flow is from the A.C. source 2 to the point 11, through the controlled diode 12, the diode 16, the motor armature 6, the diode 18 to the point 9, and back through the IR compensation circuit 34 to the A.C. source 2.

The effect of the controlled diodes 10 and 12 on the current which passes from the alternating current source 2 to the motor 5 is essential to the operation of the control circuit. During one-half cycle all of the current flowing through the armature 6 passes through the controlled diode 10, and during the subsequent half cycle all of the current passes through the controlled diode 12. Therefore, the total current to the armature 6 may be controlled by the controlled diodes 10 and 12.

Prior to discussing in more detail the manner in which the controlled diodes regulate the motor, it is necessary to observe the manner in which a control signal proportional to motor speed deviation from a desired speed is derived. The first step entails obtaining a signal which is respresentative of the motor speed. In a preferred embodiment according to this invention the representative voltage is obtained by measuring the potential which appears across the motor armature.

The counter E.M.F. of a D.C. shunt motor is represented by the equation $$\text{E.M.F.} = \frac{N \times Z \times \phi}{60} \times 10^{-8} \text{ (volts)} \quad (1)$$

where $Z$ = total number of active conductors per path (constant for any particular motor);
$\phi$ = the air gap flux cut by the armature conductors; and
$N$ = revolutions per minute of the armature.

The voltage applied to the armature ($E_s$) may be represented by the following equation:

$$E_s = \text{E.M.F.} + IRa$$

where $I$ = motor armature current; and
$Ra$ = motor armature resistance.

substituting Equation 2 in Equation 1 it is possible to represent the motor speed by the following equation:

$$N = 60 \frac{(E_s - IRa)}{Z\phi} \times 10^8 \text{ (r.p.m.)} \quad (3)$$

From Equation 3 it is apparent that if $Z$ and $\phi$ are relatively constant, and $IRa$ is relatively small then the speed is approximately proportional to the voltage ($E_s$) appearing across the motor armature.

The speed detection circuit 28 of FIG. 1 receives a voltage signal proportional to the motor speed by means of the lines 25 connected across the armature 6. The purpose of the speed detection circuit 28 is to derive a signal which is proportional to the deviation of the motor speed from a desired speed. This signal is referred to as the deviation signal. Essentially, this deviation signal is derived by comparing the potential taken from across the armature 6 with a reference potential. This reference potential may be adjusted to correspond to any desired speed setting.

The deviation signal is applied as an input to the magnetic amplifier 32 by means of the lines 29. The firing angle of the magnetic amplifier is controlled by the amplitude of the deviation signal. During the first half cycle of the alternating current source 2 a signal appears on the output lines 31. During the second half cycle of the source 2 a signal appears on the output lines 33.

Assume that during the first half cycle the polarity at the points 9 and 10 in the rectifier network 8 is such that the controlled diode 10 tends to conduct. This diode, however, does not conduct until the control element 22 receives a sufficient potential. Therefore, during the first half cycle of the source 2, or between 0 and 180 electrical degrees, the controlled diode 10 may conduct whenever a sufficient potential is applied to the control element 22. Some time during his first 180 electrical degrees the magnetic amplifier may produce an output on the lines 31, thus permitting the controlled diode 10 to pass current during a portion of the half cycle. During the second half cycle or between 180 and 360 electrical degrees the controlled diode 12 may conduct. It is during the second half cycle that the magnetic amplifier 32 produces a signal on the lines 33 which accordingly controls the portion of time during which the controlled diode 12 may pass current.

The manner in which the circuit displays its speed control function over the motor may be understood by examining the two possible control conditions, i.e., when the motor tends to increase speed and when the motor tends to decrease speed. If the motor increases, then the potential appearing across the armature 6 and the lines 25 increases because of the increased counter E.M.F. within the armature. The speed detection circuit 28, which compares the potential across the lines 25 with a reference potential, responds to this increase in potential and decreases the magnitude of the deviation signal appearing on the line 29. When the deviation signal decreases, the firing angle of the magnetic amplifier 32 increases, i.e., an output signal occurs during a smaller portion of the respective half cycle. As the duration of the output signal on the lines 31 and 33 decreases, the current through the controlled diodes 10 and 12 likewise decreases thus decreasing the current through the armature 6 and reducing the speed of the motor 5. Accordingly, the tendency of the motor to increase speed is counteracted by a decrease in armature current.

Similarly, if the motor 5 tends to decrease speed, the potential across the armature 6 decreases, the speed detection circuit 28 causes the deviation signal to increase, the firing angle of the magnetic amplifier 32 decreases causing the signal on the lines 31 and 33 to increase in duration thus permitting the control diodes 10 and 12 to pass a larger amount of current through the motor armature 6 and thus increasing the motor speed. Accordingly, a tendency of the motor to decrease speed is counteracted by an increase in current through the motor armature.

A more detailed explanation of the operation of a magnetic amplifier in combination with a controlled diode may be obtained by referring to Patent No. 2,925,546 issued to Baruch Berman and assigned to the assignee of the present invention.

The IR compensation circuit 34 compensates for error introduced by the voltage drop across the internal resistance of the armature 6. Referring to Equation 3, it is noted that the speed is proportional to the voltage $E_s$ applied to the armature minus the voltage drop across the motor armature $IRa$ provided $Z$ and $\phi$ are constant. Therefore, if the voltage drop across the internal resistance of the motor armature is not compensated for, a degree of error is introduced.

The voltage drop across the internal armature resistance is approximately proportional to the total incoming current from the alternating current source 2. The IR compensation circuit therefore samples the incoming current and derives a voltage proportional thereto. This voltage is then connected in opposing relationship to the potential $E_s$ measured across the armature 6 thus compensating for the discrepancy caused by the voltage drop within the motor armature.

The speed detection circuit 28 is shown in greater detail in the schematic diagram of FIG. 2. In this circuit it is desired to obtain a deviation signal which is related to the difference between the desired motor speed and the actual motor speed. The deviation signal may be derived by comparing the potential across the armature with a reference voltage across a Zener diode 54 which forms part of a reference leg. A diode of the Zener type tends to act like a voltage regulator and maintains a fixed potential across its terminals. The path for the current through the reference leg is from one side of the A.C. line 26, through a resistor 48, a resistor 50, the Zener diode 54 to a negative line 60. The path is completed to the other side of the A.C. line through the diode 18 in FIG. 1. The voltage dividing potentiometer 58 is connected in parallel with the series combination of resistor 56 and reference Zener diode 54. By positioning the slider 59 on the voltage divider 58 which is in parallel with the series combination of Zener diode 54 and resistor 56 any desired reference voltage may be obtained. This reference voltage is representative of the desired speed, and therefore variation of the slider 59 is the means employed for selecting the desired motor speed.

The condenser 52 filters out some of the ripple voltage caused by the A.C. source from the Zener diode 54. This also delays the setting up of the reference voltage across the Zener diode 54 during starting and run-up times permitting a smoother controlling action.

The potential which is compared with the reference potential is proportional to the voltage appearing across the motor armature 6. This proportional voltage is obtained by a sensing leg placed across the motor armature 6. This sensing leg includes a variable resistor 40, a resistor 42, a resistor 43, a variable resistor 44 and a resistor 56. The IR compensation circuit is connected at the terminals C and D across the resistor 44, but at this point it may be assumed that this circuit is not connected. The capacitor 46 filters out unwanted ripple signals appearing at point 45 of the voltage divider.

The potential appearing at point 45 of the voltage divider and at terminal A is approximately proportional to the speed of the motor 5. The setting of the slider 59 of the voltage divider 58 produces a reference potential at terminal B which is representative of a desired speed. The potential appearing between the terminal A and the terminal B is the deviation signal and is related to the deviation of the actual speed from the desired speed. Normally the potential at terminal A is somewhat negative with respect to terminal B. Accordingly, if the motor speed increases, the potential at terminal A rises to become less negative with respect to terminal B, and the deviation signal between terminals A and B decreases. Similarly, if the motor speed decreases, the potential at terminal A decreases becoming more negative with respect to terminal B and the deviation signal increases. Also, changing the position of the center tap 59, changes the reference voltage at terminal B causing a corresponding increase or decrease in the deviation signal between terminals A and B.

The magnetic amplifier employed according to the preferred embodiment of this invention is shown in greater detail in FIG. 3. The amplifier 32 includes sections 61 and 63. Energy is applied to these sections through an isolation transformer 62. A pair of terminals 66 are used to connect to the alternating current source 2 as shown in FIG. 1 and energize a primary winding 64. Secondary windings 68 and 70 of the transformer 62 provide alternating current energy to the magnetic amplifier section 61. Secondary windings 72 and 74 provide alternating current energy to the magnetic amplifier 63.

The operation of the magnetic amplifier can best be understood by considering the sections 61 and 63 separately. The principal component of the magnetic amplifier 61 is a square loop magnetic core 76. Associated with this core is an output winding 84, a reset winding 78, a control winding 80 and a coupling winding 82. The output circuit associated with the output winding 84 consists of a diode 92, a resistor 94, a resistor 96 and the secondary winding 70. The reset circuit associated with the reset winding 78 includes a diode 86, a resistor 90, a resistor 88 and the secondary winding 68. The deviation signal appearing across terminals A and B of the speed detection circuit shown in FIG. 2 is applied to the control winding 80.

The manner in which this magnetic amplifier operates will be explained by following the operation through three half cycles of the alternating current source as applied to the terminals 66. Assume that during the first half cycle the polarities on the secondary windings 68 and 70 are as shown in FIG. 3. Under these conditions the diode 92 in the output circuit permits current to flow. As the current flows through the output winding 84, flux is created in the core 76 driving it to saturation. During this first half cycle the biased diode 86 prevents any current flow in the reset circuit.

During the second half cycle it is desired to take the core from saturation and reset it at a point which is representative of the signal applied to the control winding 80. During this half cycle the polarity on the secondary windings 68 and 70 are opposite to those shown in FIG. 3. The diode 92 prevents any current flow in the output circuit. The diode 86 in the reset circuit permits current to flow through reset winding 78 which creates flux in the core 76 in a direction to take the core from saturation. The magnitude of the current in the reset winding 78 is controlled by the resistors 90 and 88. Normally terminal A is negative with respect to terminal B causing current to flow through the control winding 80 in a direction which creates a flux in the core 76 opposing that created by current through the reset winding 78. The current through the control winding 80 caused by the deviation signal decreases the amount of reset during the second half cycle.

During a third half cycle the polarities on the secondary windings 68 and 70 are again as shown in FIG. 3. At the beginning of this half cycle the core 76 is not saturated (partially reset) and therefore the output winding 84 presents a high impedance compared to the impedance of the output resistor 96. The potential applied to the output circuit is dropped almost entirely across the output winding 84 until such time as the core 76 has absorbed a sufficient amount of energy to again become saturated. Once the core 76 has become saturated the output winding 84 presents a low impedance to the output circuit thereby permitting the potential applied to the output circuit to be dropped primarily across the output resistor 96.

Figure 4A:
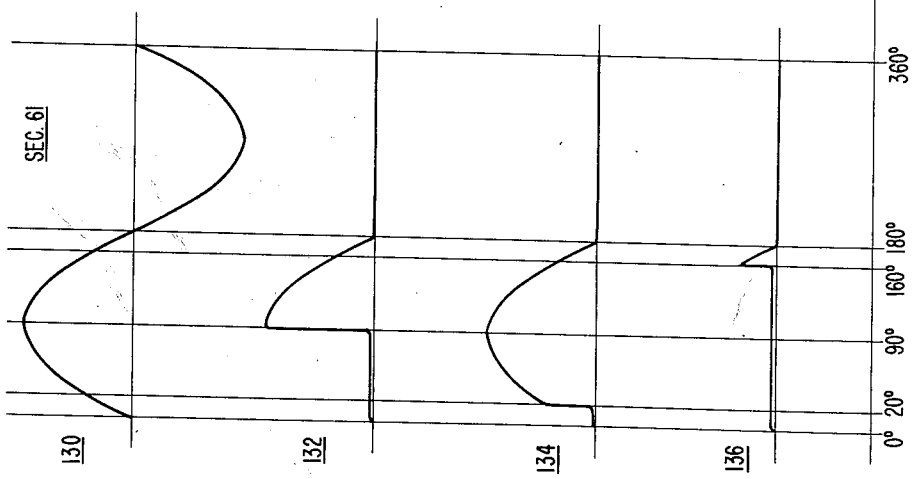

The output of the amplifier section 61 as developed across the output resistor 96 and appearing at terminals 116 and 118 is shown in FIG. 4a. The curve 130 represents the alternating current supply potential applied to the terminals 66. Assume that the connections are such that the output circuit of section 61 drives the core into saturation and produces an output signal during the positive half cycle of the A.C. source, i.e., between 0 and 180 degrees. Curve 132 of FIG. 4a represents the shape of the output signal appearing between terminals 116 and 118 of FIG. 3 when a signal of moderate magnitude is applied to the control winding 80. Under these conditions the flux created by the reset winding is moderately opposed resulting in moderate reset during the second half cycle of the operation. Accordingly, during the third or output producing half cycle, approximately the first 90 electrical degrees are required to supply energy for saturating the core 76. During the remaining 90 degrees, that is between 90 and 180 degrees, an output potential is developed across output resistor 96. A signal of moderate magnitude on the control winding 80 of FIG. 3 produces an output signal across the resistor 96 of moderate duration, or more precisely, as shown in the curve 132 of FIG. 4a, the magnetic amplifier has a firing angle of approximately 90 degrees.

If the signal applied to the control winding 80 is relatively large, then the flux created by the control winding 80 and the flux created by the reset winding 78 greatly oppose one another resulting in relatively little reset. Therefore, during the third or output producing half cycle only a small amount of time is required to saturate the core 76. The signal which appears across the output resistor 96 is as shown in curve 134 of FIG. 4a. This curve shows that the magnetic amplifier has a firing angle of approximately 20 degrees.

If the potential applied to the control winding 80 is relatively small then there is little opposition to the flux created by the reset winding 78. The core 76 is then greatly reset thus requiring a relatively long time during the third half cycle to saturate the core 76. Under these circumstances the signal across the output resistor 96 is shown in the curve 136 of FIG. 4a. In this instance the magnetic amplifier has a firing angle of approximately 160 degrees.

The operation of the magnetic amplifier section 61 may be summarized by noting that a small input signal on the control winding 80 produces a relatively small output with a large firing angle. A relatively large input signal on the control winding 80 produces a relatively large output with a small firing angle.

The amplifier section 63 which includes the square loop magnetic core 98 is essentially the same as the amplifier section 61. Amplifier section 63 contains a reset circuit which includes the reset winding 102 associated with the core 98, a diode 104, a resistor 106 and a resistor 108 and the secondary winding 72. The output circuit includes an output winding 109 associated with the core 98, a diode 110, a resistor 112, resistor 114 and the secondary winding 74. The input signal is applied to the control winding 105 which is in series with the control winding 80 of amplifier section 61. The essential difference between the two amplifier sections 61 and 63 is that they produce outputs on alternate half cycles of the alternating current source as applied to terminals 66.

The output signals of the amplifier section 63 as developed across the output resistor 114 are shown in FIG. 4b. The curve 138 shows the same alternating current supply potential as shown in curve 130; the curve 140 shows the output produced when a moderate input signal is applied; the curve 142 shows the output signal when a relatively large input signal is applied; and curve 144 shows the output when a relatively small input signal is applied. The curves of FIG. 4b illustrate that the amplifier section 61 produces an output only during the first 180 electrical degrees of the alternating current source, and that section 63 produces an output only during the alternate half cycle of the alternating current source, that is between 180 and 360 electrical degrees. The resistors 88 and 108 in the reset circuits are adjusted to compensate for variations in the components employed in the two sections so that for similar input conditions the output signals are substantially identical for the two sections.

The resistors 90 and 106 in the reset circuits are adjusted so that the amplifier sections produce zero output whenever there is zero input applied to the control windings 80 and 105. Current in the wrong direction in windings 80 and 105 is prevented by a diode 124. Since terminal A is normally negative with respect to terminal B, current flows from terminal B, through the control winding 105, the control winding 80, the diode 124 to terminal A. Should terminal A become positive with respect to terminal B as may happen when the reference potential is lowered to obtain a lower speed, then diode 124 prevents current flow through the control windings 80 and 105. In such situations adequate control is obtained by merely reducing the input signal to zero. A capacitor 128 and a resistor 126 associated with the diode 124 slow down the amplifier response during transient conditions. The closed loop circuit including a coupling winding 82 and a coupling winding 83 further slows the response during transient conditions. During the half cycle in which the amplifier section 61 produces an output, a potential is induced in the coupling winding 82. The corresponding current through the coupling windings 82 and 83 creates a flux in the core 98 which aids in the reset of the section 63. Similarly, during the half cycle in which section 63 produces an output, a signal is induced in the coupling winding 82 which aids the reset of the section 61. The closed loop connection permits a signal in the coupling winding proportional to the input signal a half cycle earlier to aid the input signal on the control winding in resetting the core. Thus, the overall amplifier response is slowed down giving smoother control when a change in operating conditions occurs.

Figure 5:
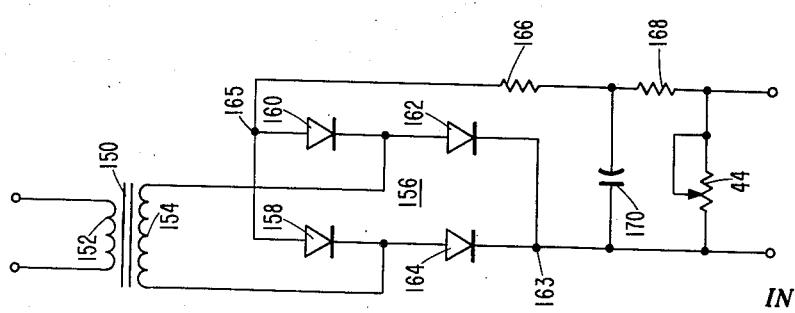
FIG. 5 is a schematic representation of the IR compensating network.

The IR compensation circuit 34 in FIG. 1 is shown in greater detail in FIG. 5. The purpose of this circuit is to derive a signal which is proportional to the voltage drop caused by the internal resistance in the motor armature 6 of FIG. 1. This signal may then be used to compensate for the discrepancy between the actual speed and the apparent speed appearing in the speed indicating signal taken across the armature. The voltage drop across the internal resistance of the armature is directly proportional to the current through the armature, which in turn is approximately proportional to the current supplied from the alternating current source 2. It follows, therefore, that a signal which is proportional to the magnitude of the current from the alternating current source 2 is roughly proportional to the magnitude of the voltage drop across the internal resistance of the motor armature.

The signal which is proportional to the current from the alternating current source 2 is provided by the IR compensating network as shown in FIG. 5. A primary winding 152 of a current transformer 150 is placed in series with the alternating current line from the alternating current source 2 in FIG. 1. The output of the transformer as developed in the secondary winding 154 provides a potential to a full-wave rectifier network 156 which includes the four diodes 158, 160, 164 and 162. The rectified output from the rectifier network 156 appears across the points 163 and 165 and is supplied to a filter network consisting of a resistor 166, a resistor 168 and a condenser 170. The filter output is then developed across the variable resistor 44. The resistor 44 is the same as that previously noted in the sensing leg of the speed detection circuit shown in FIG. 2.

Equation 3 as previously derived gives the speed of a D.C. shunt motor as $$N = 60 \frac{(E_s - IRa)}{Z\phi} 10^8 \qquad (3)$$

Since $Z$ and $\phi$ are relatively constant for any particular motor, the speed of the motor is proportional to the quantity $(E_s - IRa)$. Since $IRa$ is relatively small, only a small amount of error is introduced by not compensating for this factor. Whenever a more accurate motor control system is desired, however, this error should be compensated for and may be done by applying a signal proportional to $IRa$ in series opposition to the speed indicating signal of the sensing leg. Since the compensating voltage and the armature voltage are arranged to oppose one another, the effect of the voltage drop across the internal resistance is actually substracted from the voltage appearing across the sensing leg. Accordingly, the potential appearing at terminal A in FIG. 2 is much more closely proportional to the speed of the motor 5.

Figure 6:
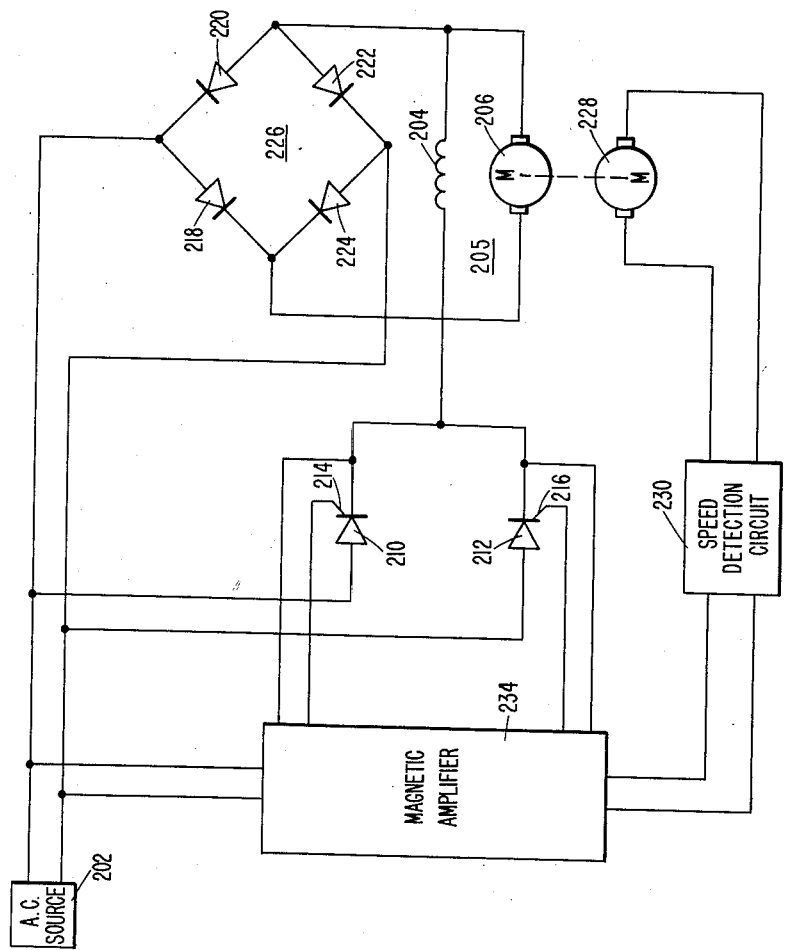
FIG. 6 is a block diagram representation according to a second embodiment of this invention.

FIG. 6 shows in block form a second embodiment according to this invention including two basic changes from that shown in FIG. 1. The first of these changes involves the use of a tachometer generator 228 to derive a signal proportional to the speed of the motor. The second change concerns controlling the speed of the motor 205 by controlling the current through the field winding 204 instead of by controlling the current through the armature 206.

The tachometer generator 228 produces a signal which is proportional to the speed of the motor. This signal is applied to the speed detection circuit 230 where it is compared with a reference voltage to obtain a deviation signal. In this case the speed detection circuit is arranged to provide a deviation signal which increases when the motor speed increases and decreases when the motor speed decreases. The deviation signal is applied to the input of a magnetic amplifier 234. The magnetic amplifier controls the two controlled rectifiers 210 and 212 in a manner substantially similar to that described in reference to the first embodiment in FIG. 1. Accordingly, alternating current during one-half cycle of the alternating current source 202 is through the controlled diode 210. The portion of the half cycle allowed to pass through this diode depends upon the firing angle of the signal coming from the magnetic amplifier 234 as applied to the control element 214. Similarly, the controlled diode 212 permits passage of a portion of the alternate half cycle from the source 202 as controlled by the magnetic amplifier through the control element 216.

By controlling the amount of current passing through the field winding 204, control over the motor speed is achieved. If the motor begins to increase its speed the signal developed by the tachometer generator 228 increases, the deviation signal created by the speed detection circuit 230 increases, the output signal developed by the magnetic amplifier 234 increases by decreasing the firing angle, and the controlled diodes 210 and 212 permit a larger current through the field winding 204 thus increasing the potential of the field winding and decreasing the speed of the motor 205. Conversely, if the motor tends to decrease its speed the opposite effect takes place causing the potential on the field winding 204 to decrease, thereby increasing the speed of the motor 205.

It is readily apparent that the motor control system described is not limited to use with a shunt motor. With only slight modification it is possible to employ the same motor control system with other types of motors such as compound, series, universal, servomotors, etc.

What is claimed is:

1. A motor control system comprising an alternating current source, a direct current motor, a rectifying network connecting said alternating current source to said direct current motor, said rectifying network containing two semiconductor controlled rectifiers connected for supplying current in the same direction to said motor during alternate half-cycles of said alternating current source, each controlled rectifier having an anode, a cathode and a control electrode, first means coupled to said motor for obtaining a signal representative of the deviation in speed of said motor from a desired value, and second means connected between said first means and said controlled rectifiers for triggering said rectifiers, said second means comprising a pair of magnetic amplifiers having control windings connected to said first means, each amplifier having a reset winding and a source of alternating voltage, a rectifier and current limiting means connected in series with said reset winding, each amplifier further including an output circuit including in series a gate winding, a source of alternating voltage, a rectifier and a load resistor connected between the cathode and control electrode of one of said controlled rectifiers, whereby the controlled rectifiers regulate the flow of power from the alternating current source to the motor in accordance with the deviation signal.

2. The combination according to claim 1 wherein said first means obtains the deviation signal from the voltage across the armature of said motor.

3. A motor control system comprising an alternating current source, a direct current motor, first means interconnecting said source and said motor, said first means including two semiconductor controlled rectifiers connected for passing current in the same direction through the motor during alternate half-cycles of said alternating current source, said controlled rectifiers having an anode, a cathode and a control electrode, speed detecting means coupled to said motor for obtaining a voltage proportional to the speed of said motor and comparing said voltage with a reference voltage to obtain a deviation signal, a magnetic amplifier connected between said speed detecting means and said controlled rectifiers, said magnetic amplifier comprising two sections connected to produce outputs similarly from both controlled rectifiers during alternate half-cycles of said source, and means for reducing the speed of response of the magnetic amplifier to a transient signal condition, said last means comprising a closed loop including a winding on the magnetic core of each section of the magnetic amplifier, the power flowing between said source and said motor is regulated by said controlled rectifiers under the control of said deviation signal.

4. A system according to claim 3, comprising a full wave bridge rectifier connected across said current source, said motor having an armature connected across said bridge rectifier and a field winding having one end connected through said controlled rectifiers to both sides of said current source and its other end connected to both sides of said alternating current source through said bridge rectifier so that full-wave direct current is supplied to said field winding.

References Cited by the Examiner

UNITED STATES PATENTS

| 2,449,797 | 9/48 | Waldie | 318—356 X |
| 2,504,123 | 8/50 | Hanecko | 318—331 |
| 2,552,203 | 5/51 | Margan | 323—85 |
| 2,753,506 | 7/56 | Eliot | 318—345 |
| 2,847,632 | 8/58 | Harvey et al. | 318—345 |
| 2,855,554 | 10/58 | Conger et al. | 318—331 X |
| 2,873,422 | 2/59 | Miller et al. | 318—345 |
| 2,920,240 | 1/60 | Macklem. | |
| 2,977,523 | 3/61 | Cockrell | 318—331 |
| 3,064,174 | 11/62 | Dinger | 318—331 X |
| 3,095,534 | 6/63 | Cockrell | 318—331 X |

FOREIGN PATENTS 604,684  9/60  Canada.

OTHER REFERENCES

Publication: Controlled Rectifiers Drive A.-C. and D.-C. Motors, by W. R. Seegmiller, Nov. 13, 1959, issue of Electronics.

ORIS L. RADER, *Primary Examiner.*

JOHN F. COUCH, *Examiner.*